United States Patent [19]
Doering, Jr.

[11] 3,813,846
[45] June 4, 1974

[54] METHOD AND APPARATUS FOR SEALING THERMOPLASTIC COVERS TO TRAYS

[75] Inventor: Henry H. Doering, Jr., Hinsdale, Ill.

[73] Assignee: C. Doering & Son, Inc., Chicago, Ill.

[22] Filed: May 16, 1973

[21] Appl. No.: 360,841

Related U.S. Application Data

[60] Division of Ser. No. 193,081, Oct. 27, 1971, Pat. No. 3,768,228, which is a continuation of Ser. No. 888,186, Nov. 26, 1969, abandoned.

[52] U.S. Cl............... 53/39, 156/69, 156/583
[51] Int. Cl............... B65b 7/28, B65b 51/14
[58] Field of Search ...... 53/39, 329; 100/38, 93 R; 156/583, 69; 219/243

[56] References Cited
UNITED STATES PATENTS

| | | | |
|---|---|---|---|
| 2,649,392 | 8/1953 | Marshall | 53/39 |
| 3,432,374 | 3/1969 | Packard et al. | 156/583 X |
| 3,452,512 | 7/1969 | Inman | 53/282 |
| 3,454,447 | 7/1969 | Corbett et al. | 156/583 X |
| 3,522,135 | 7/1970 | Page | 156/583 |

Primary Examiner—Robert L. Spruill
Attorney, Agent, or Firm—Gary, Juettner, Pigott & Cullinan

[57] ABSTRACT

Method and apparatus for sealing thermoplastic covers to product containing trays; for example in the embodiment disclosed for converting bulk butter and the like into individual service patties and for sealing each pat in a totally enclosed sanitary server.

5 Claims, 11 Drawing Figures

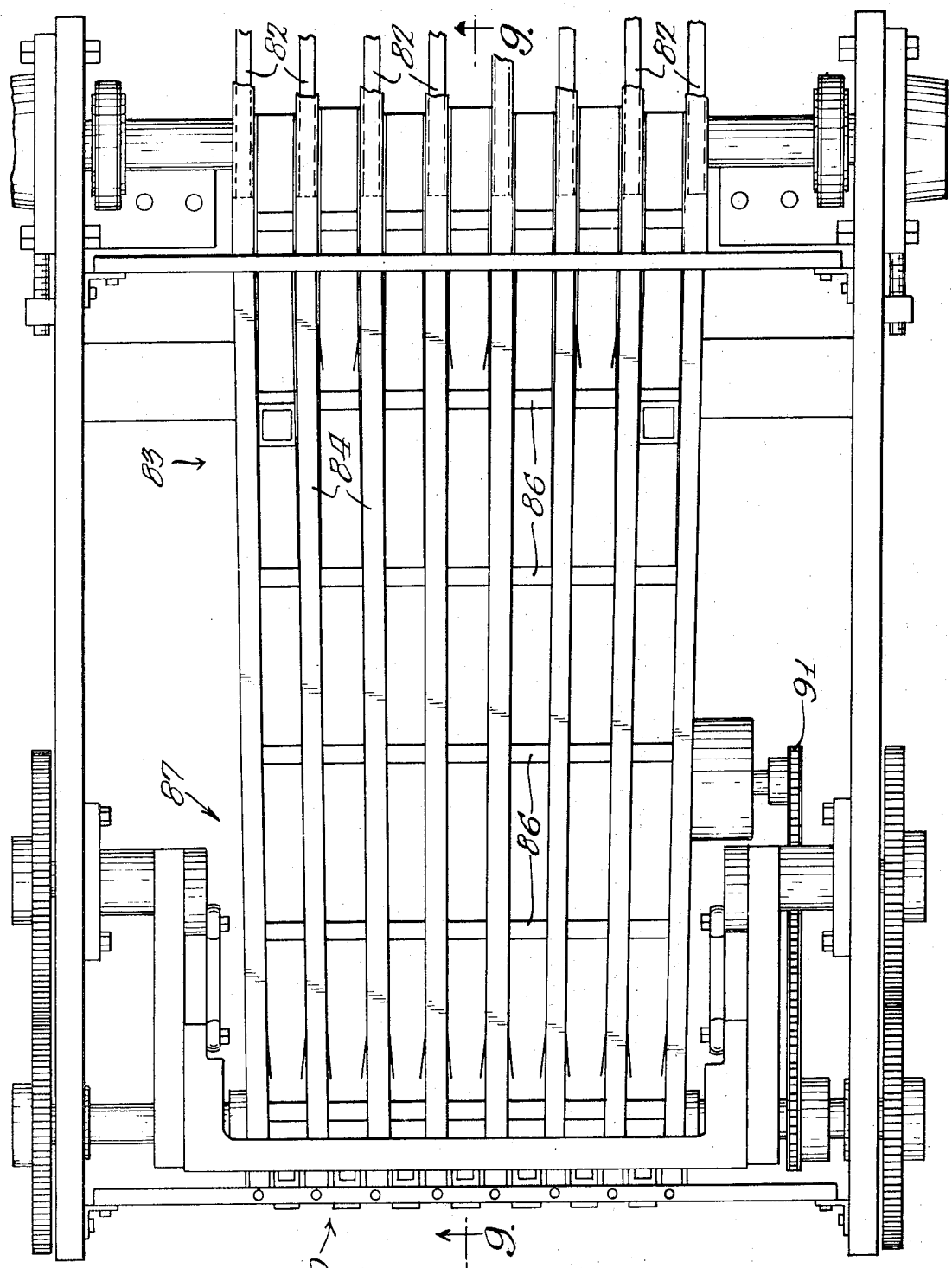

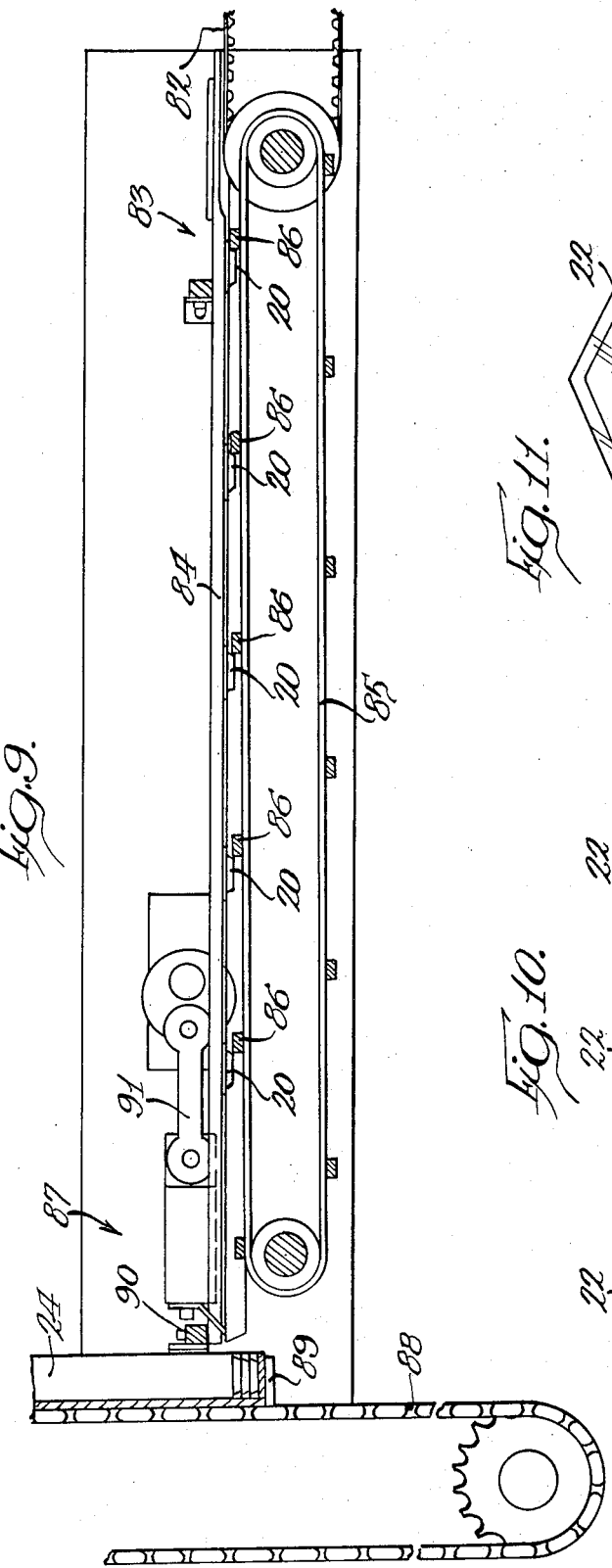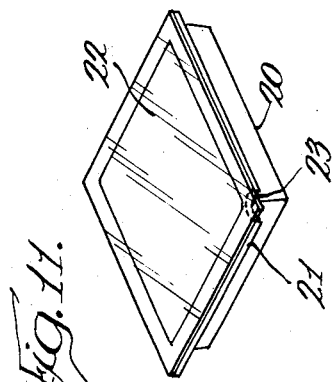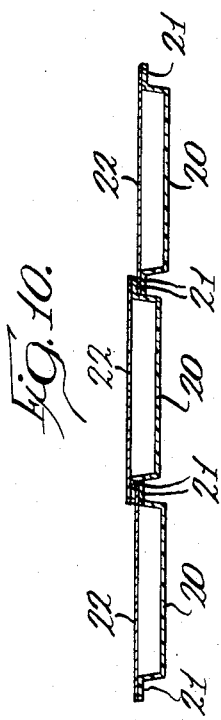

METHOD AND APPARATUS FOR SEALING THERMOPLASTIC COVERS TO TRAYS

CROSS REFERENCE

This application is a division of my copending application Ser. No. 193,081, filed Oct. 27, 1971, and now U.S. Pat. No. 3,768,228 which in turn is a continuation of my application Ser. No. 888,186, filed Nov. 26, 1969, now abandoned.

BACKGROUND OF THE INVENTION

Heretofore, apparatus has been devised for converting bulk butter into individual service patties and for placing the patties on small cardboard trays with or without a wax paper overlay. The resultant individual services have proven very popular, satisfying the economic and "portion control" objectives of restauranteurs and providing the customer with at least a degree of individuality and some sense of sanitation. However, even with the wax paper overlay, the sides of each pat are exposed to the air and the pat is not actually preserved or served in a completely sanitary condition.

SUMMARY OF THE INVENTION

The objects of this invention are, first, to provide an attractive, completely sanitary, hermetically sealed individual service or pat of butter or the like, and second, to do so in a convenient, economical and practical manner in keeping with todays concepts of economical mass production.

Other objects and advantages will become apparent in the following detailed description, wherein reference is made to the accompanying drawings; the description and drawings being given for the purpose of acquainting those skilled in the art with the manner of making and using the invention, and the best mode presently contemplated by me of carrying out my invention.

THE DRAWINGS

FIG. 8 is a plan view of apparatus in sequence with the apparatus of FIG. 3 for arranging the individual, hermetically sealed, butter services in compact relationship and for packing the same compactly into shipping containers;

FIG. 9 is a vertical section of the apparatus of FIG. 8, the view being taken substantially on line 9—9 of FIG. 8;

FIG. 10 is an end elevation depicting the compact relationship of the individual services as arranged for packing; and FIG. 11 is a perspective view of one of the hermetically sealed individual services.

DETAILED DESCRIPTION

The objective of the present invention is automatic filling and hermetic sealing of the individual butter service depicted in FIG. 11, namely, a shallow tray 20 filled with butter or the like and covered by a top member 22 which is sealed continuously over a peripheral flange 21 on the tray 20, whereby to provide a fully enclosed and hermetically sealed, and therefore sanitary, individual butter service. To render the service easy and convenient to use, the flange 21 is notched as at 23 to facilitate grasping and removal of the cover 22.

Figure 1:
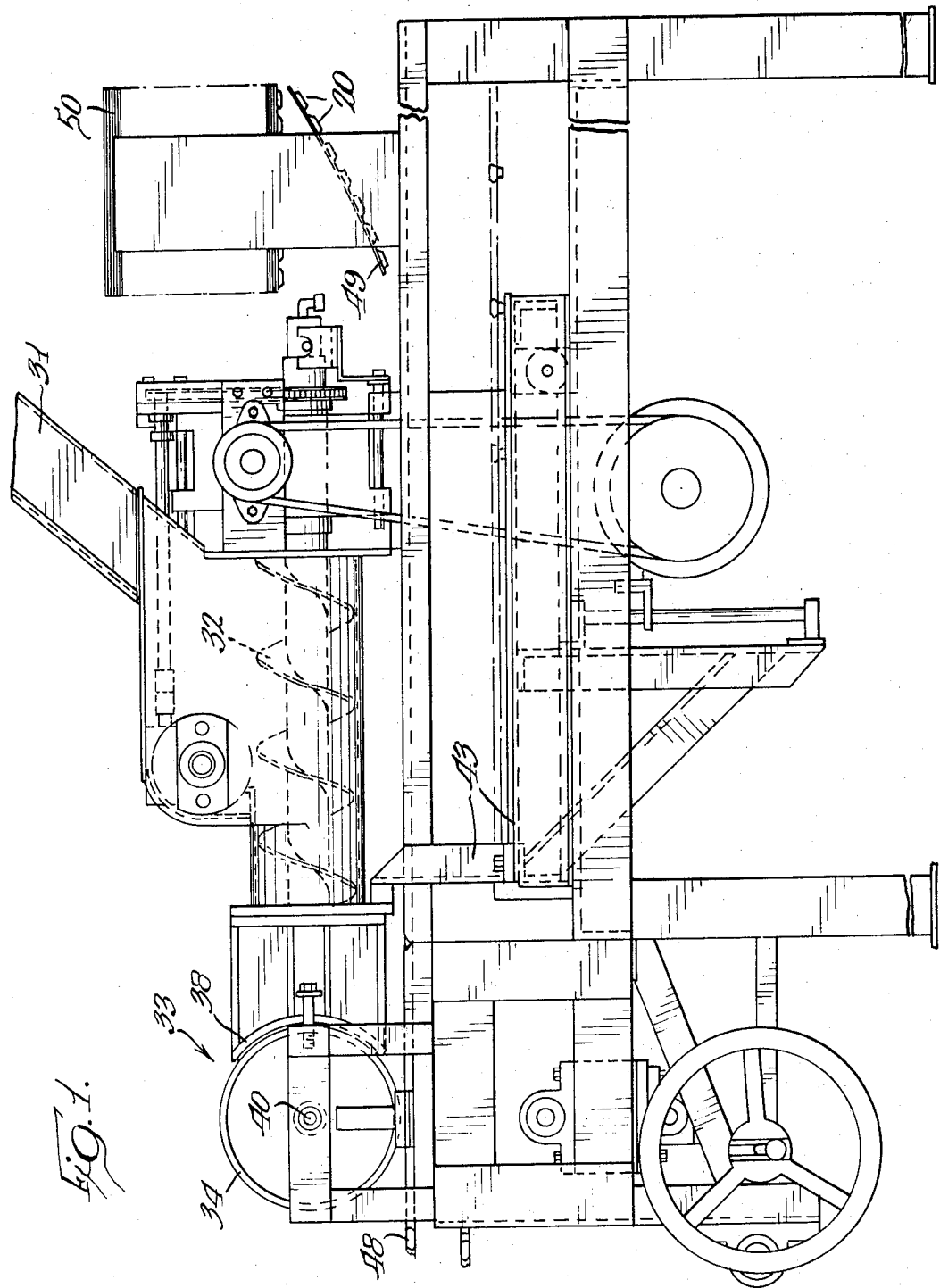
FIG. 1 is a side view of the apparatus for converting butter or the like into individual pats and for placing the pats into complemental trays.
Figure 2:
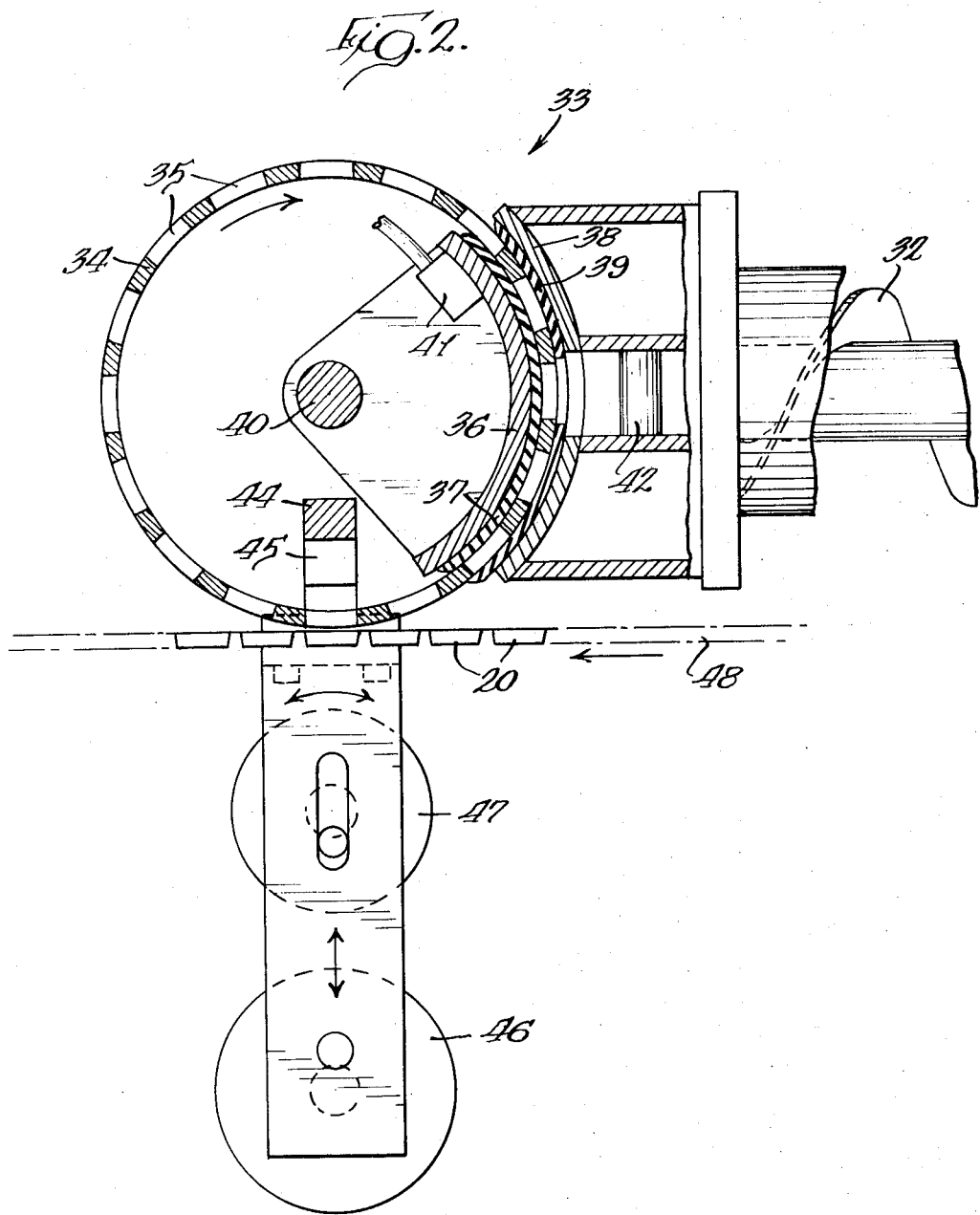
FIG. 2 is a fragmentary vertical section of the principal components of the apparatus of FIG. 1.

Referring to FIGS. 1 and 2, bulk butter is fed via a chute 31 to an impeller or extruder 32, suitably of the screw or auger type, which forces the butter through a patty former or printer 33. The printer is comprised of a rotary cylinder 34 having a plurality of axially extending circumferentially spaced rows of holes or apertures 35 therein, each of a configuration and thickness to accommodate formation therein of a pat of butter of the desired size and weight. The forming cylinder 34 is rotated by a master drive for the apparatus and passes, as best shown in FIG. 2, between a pair of complemental partially cylindrical members, namely, a backing shoe 36 having an anti-friction facing 37 thereon and adapted to close the butter pockets or holes 35 at the radially inner side thereof, and an extrusion head 38 having a peripheral portion carrying an anti friction facing 39 for sealed engagement with the outer surface of the forming cylinder.

The forming cylinder 34 is preferably journaled on a stationary shaft 40 and the backing shoe 36 is suitably mounted on the same shaft for cooperative engagement with the cylinder. The shoe 36 is also provided, at the locus thereon where each butter pocket or aperture 35 becomes sealed between the members 36 and 38, with a vacuum header 41 whereby each pocket is evacuated to facilitate subsequent reception therein of a full charge of butter.

The extrusion head 38 is mounted on and communicates with the housing of the extruder 32, whereby butter is forced through the head to the cylinder to fill each pocket or aperture 35 with butter as the pockets pass in sequence adjacent the central hole or passage in the head 38. In the preferred embodiment of the invention, there are 16 rows of pockets or holes in the cylinder 34, and seven holes in each row. Thus, the central passage in the header 38 is horizontally elongate so as to fill all seven holes in each row with butter as each row passes the header. This requires a transition in passage shape from the circular section of the screw extruder to the described rectangular form of the header passage. To assist in uniform distribution of the butter in making this transition, I prefer to install splitter or spreader bar 42 in the header 38 at the front end of the screw 32.

Preferably, the extruder assembly 31, 32, 38 is mounted on a reciprocal carriage 43 to accommodate movement of the head away from the cylinder to faciliate cleaning of the apparatus and to accommodate movement of the head into adjustable engagement with the rotary forming cylinder 34 so as to provide for fully sealed yet low friction engagement therebetween.

As each of the filled rows of pockets leaves the extruder head and backing shoe, the row approaches a knock out bar 44 located within the interior of the cylinder 34 adjacent the lower limit of cylinder travel. The knock out bar carries a plurality of depending plungers 45 of a number, size and spacing to complement the pockets 35 in each row, and adapted to be moved into the pockets to neatly eject the pat of butter from each of the pockets.

The bar 44 is operated by a double eccentric assembly driven by a suitable take off from and in properly timed sequence with the cylinder drive. This assembly is comprised of a lower main eccentric 46 for raising and lowering the bar and an intermediate eccentric 47 for imparting translatory movement to the bar, whereby the plungers 45 are entered into the pockets 35, swing with the cylinder through a short arc of movement, are raised up out of the pockets, and then returned to their starting point for entry into and movement with the next row of pockets 35. In this manner, pats of butter are neatly and fully ejected from the pockets. To facilitate ejection of the pats, and stripping of the pats from the knock-out bar, the bar 44 or at least the plungers 45 thereof are heated electrically or in other suitable manner.

Mounted below the butter extruding and patty printing (forming) apparatus is an endless conveyor 48 driven by a suitable take off from the cylinder drive and moving synchronously with the cylinder 34 and the knock-out bar 44. Upstream of the extruder, individual sheets of film material 49 are fed seriatim from a stack 50 onto the conveyor for passage below the cylinder 34. The sheets of film material are preformed to have rows of trays 20 formed therein, each row including the same number of trays as there are pockets 35 in each of the rows of the cylinder 34. Consequently, each time the plungers 45 eject a row of butter patties from a row of pockets or holes 35, a row of trays 20 arrives below the cylinder to receive the patties therein.

The conveyor 48 then carries the filled trays 20 (still integral with the sheet 49) beneath a roll 51 (FIG. 3) where a sheet or continuous film 52 of the cover or top material 22 is laid on top of the filled trays continuously across the width of the sheet of tray material; whereafter the covered trays are pushed onto spaced slide bars 53 which engage the lower surface of those parts of the sheet 49 constituting the side portions of the tray flanges 21.

Figure 3:
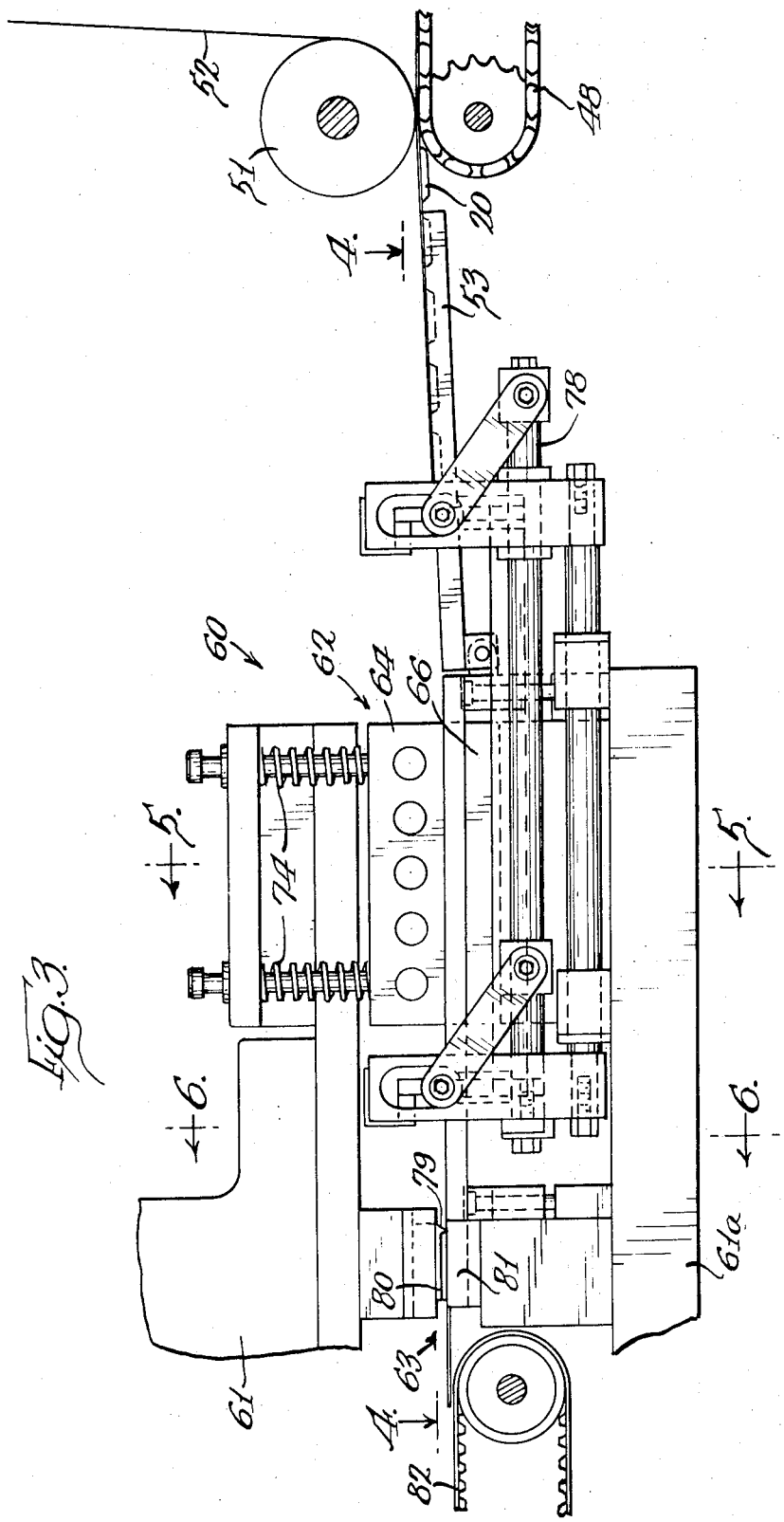
FIG. 3 is a side view of apparatus in sequence with the apparatus of FIG. 1, for placing a heat sealable cover over the pat filled trays, for sealing the cover to the trays and for cutting the covers and trays into individual services.

The slide bars 53 lead to a heat sealing and cut off mechanism 60 which is depicted in FIGS. 3 to 7, and which is comprised principally of a heavy duty, high speed, high pressure hydraulic press, shown fragmentarily in FIG. 3. The press is comprised of a vertically movable upper cylinder 61 and a stationary base 61a. The moveable cylinder of the press carries a heat sealing mechanism indicated generally at 62, and a cut off device, indicated generally at 63, which will now be described in detail.

The heat sealing mechanisms 62 service. (FIG. an electrically or otherwise heated upper die member 64 which is mounted on the cylinder of the press for up and down movement into and out of engagement with the covered trays. The lower surface of this die is of waffle-like configuration so as to present criss-crossed sealing projections 65 engageable with the areas of the sheets 49-52 comprising the flanged parts 21 of the completed butter service. FIG. 11).

Figure 5:
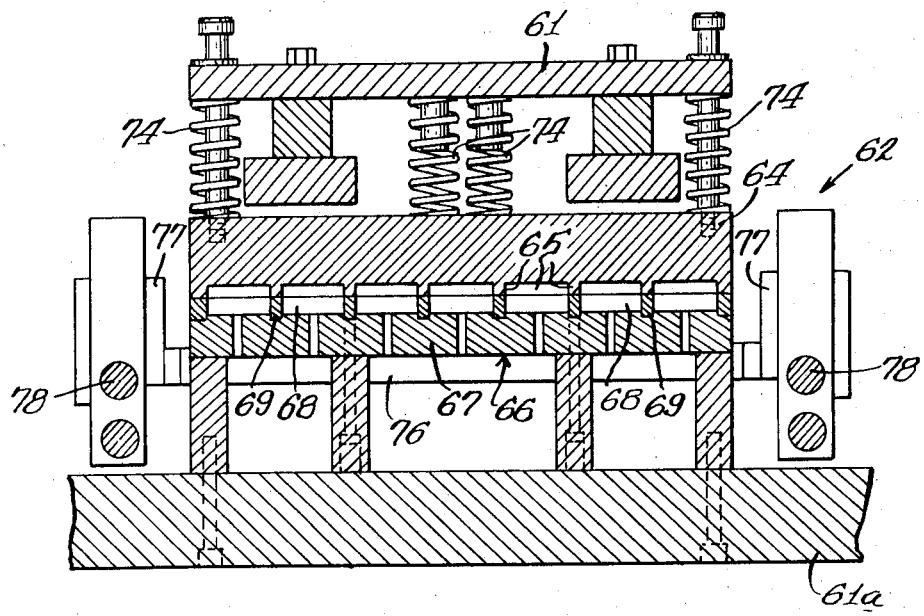
FIG. 5 is a cross sectional view of the sealing apparatus, the view being taken substantially on line 5—5 of FIG. 3.
Figure 7:
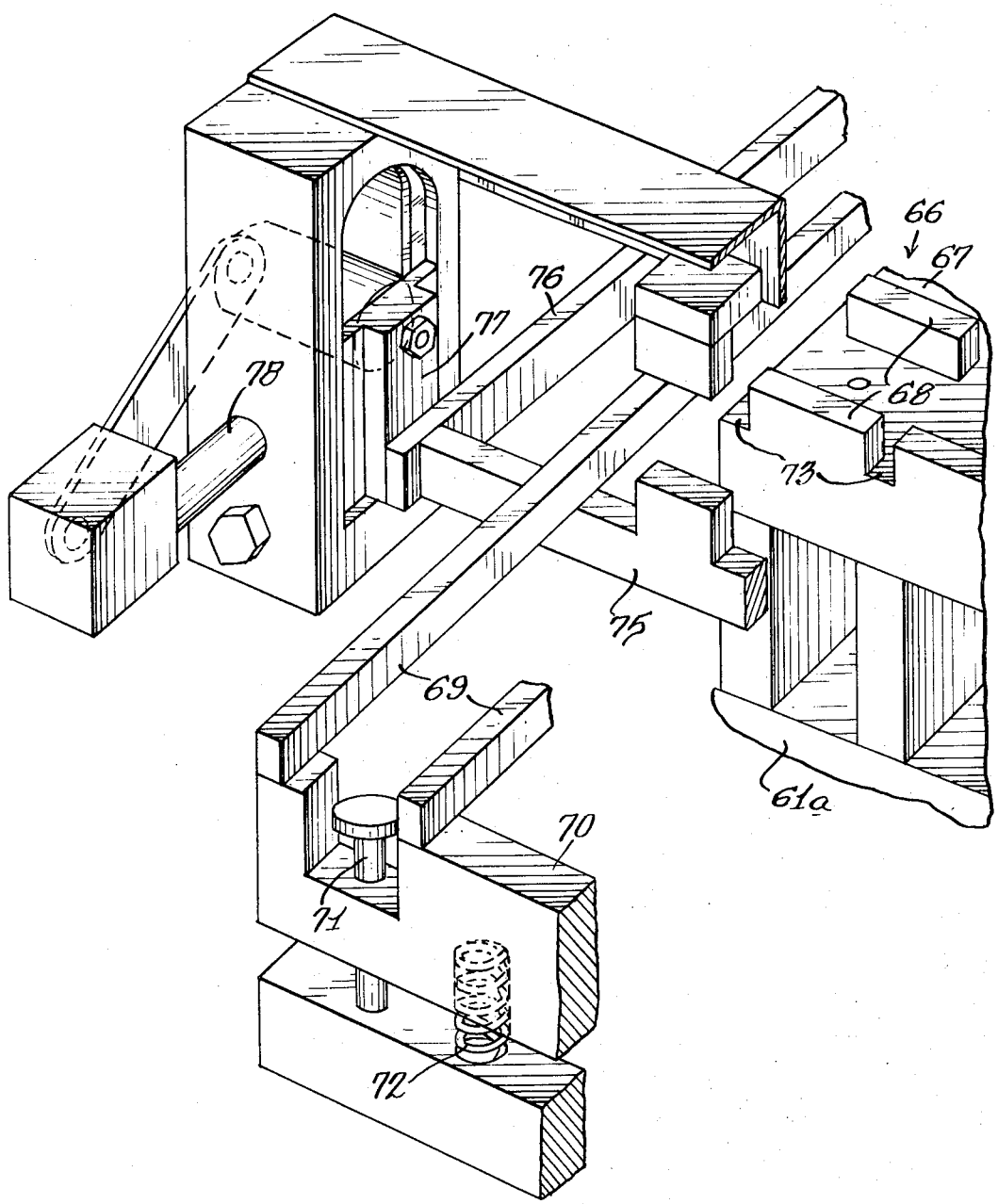
FIG. 7 is a perspective view of components of the heavy duty press utilized in sealing and cutting the covers and trays.

Mounted on the base plate 61a of the hydraulic press is a lower die member 66 comprised of a base 67 having transverse bars 68 thereon for engagement with the transverse portions of the flange forming parts of the sheet 49 and vertically moveable longitudinal bars 69 comprising extensions of bars 53. As shown in FIGS. 5 and 7, the bars 69 are mounted at their ends on crossbars 70 which are guided for vertical movement by upstanding pins 71 and normally biased upward by compression springs 72. The bars 69 are aligned with slots 73 in the bars 68 whereby the bars 69 may be pressed into coplanar relation with the bars 68, but are normally moved upward above the latter by the springs 72 so as to accommodate passage of the tray material 49 over the transverse bars 68 without interference.

In use, the tray material 49 is advanced to the heat sealing mechanism and aligned with the projections 65, 68 and 69 thereon. The press is then operated to force the die 64 down on the die 66 whereupon the bars 69 are forced down into coplanar relation with the bars 68 and the bars or projections 65, 68 and 69 forcibly engage the opposite surfaces of the flange forming parts of the sheets 49 and 52 and the projections 65 heat seal the engaged portions of the sheet 52 to the engaged portions of sheet 49. To provide a short dwell time during force application, and to prevent excessive application of force to the dies and packaging materials, the upper die 64 is preferably mounted on the press by means of springs 74.

In accordance with the invention, and for purposes of providing high speed operation, the press 61 causes the dies to engage the sheets of tray forming material (a) at high pressure (b) repeatedly (c) for individually short durations of time. Specifically, each tray is moved step by step through four sequential sealing operations in the illustrated embodiment of the invention (see FIG. 4) and at each stage the die exerts high pressure on the material to facilitate complete sealing in an exceptionally short period of time.

With the apparatus of this invention, using a press having a capacity of 28 tons, production is in the order of 81,000 individual butter services per hour. Based on 90 servings per pound, the machine automatically prints and packages 900 lbs. of butter per hour. In contrast, in the prior art, it had been proposed to heat seal a cover onto a tray at normal pressures and temperatures for periods of time conventional for the heat sealing of thermoplastic materials. With such operation, the apparatus had a production rate less than 25 percent of that of my apparatus.

Figure 4:
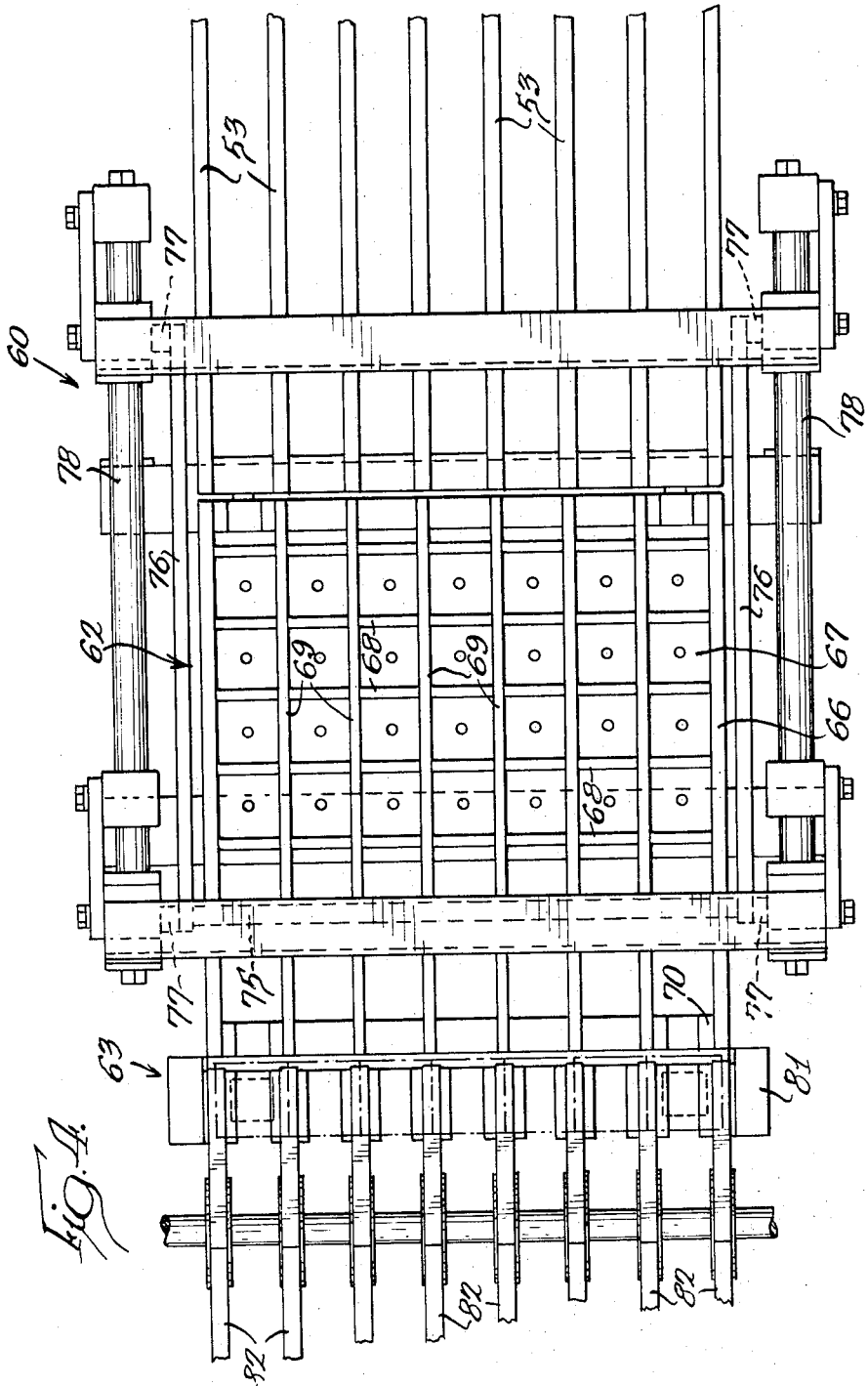
FIG. 4 is a horizontal section of the apparatus of FIG. 3, the view being taken substantially on line 4—4 of FIG. 3.
Figure 6:
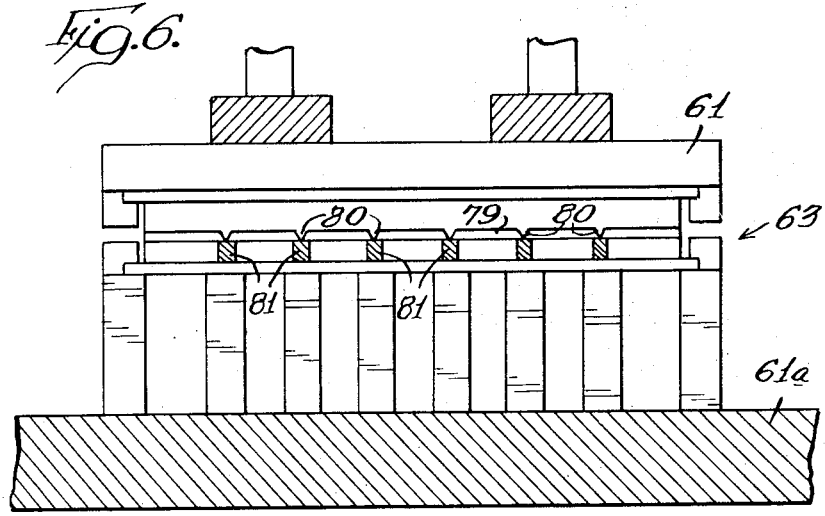
FIG. 6 is a cross sectional view of the cutting apparatus, the view being taken substantially on line 6—6 of FIG. 3.

As shown in FIGS. 4 to 6, the instant machine works simultaneously on four transverse rows each containing seven trays. At said production rate of 81,000 services per hour, the press will operate at approximately 11,571 cycles per hour, or approximately 3.2 cycles per second, or one cycle in one-third of a second. Considering the time required for the press to raise the upper die, reverse its direction of movement and lower the die onto the covered trays, the duration of each pressure engagement of the die with the trays does not exceed 1/10 of a second. The operation of the machine is thus seen to be at extremely high speed with exceedingly short dwell times.

The butter patties are traditionally about one inch square or slightly larger so that the individual trays 20, in order to provide internal clearance space and the marginal flange, will usually run about 1⅝ inch square with a ⅛ inch flange. With the 28 ton press, and the 28 tray press area, the pressure applied per press stroke equals one ton per tray and thus more than one ton per square inch of flange area.

It will therefore be appreciated that each tray has its cover sealed to it by virtue of four sequential engagements therewith of the heated dies, each at a pressure in the order of one ton per tray or one ton per square inch, and each for only a fraction of a second. It is in this manner that I am able to obtain the very high production rates above described.

To insure controlled movement of the packaging material through the heat sealing stages, a tray stepping mechanism is provided. This mechanism comprises a tray engaging and moving bar 75 (FIG. 7) mounted between the heat sealing and cut off devices and a drive unit therefor comprising a frame 76, rocker arms 77 supporting each corner of the frame, and rocker arm drive bars 78 extending along both sides of the press, the drive bars being operated in customary manner in synchronism with the press 61, for example by press operated drive cams, to sequence the rows of trays step by step through the press. If desired, driving bars 75 can be provided upstream and downstream from the sealing dies and/or grippers could be provided thereat for moving the trays.

As the covered and sealed rows of trays leave the heat sealing mechanism 62, they are moved row by row by the bar 75 to the cut off device 63. This comprises a transverse cutter bar or knife 79 and a plurality of longitudinal cutter bars or knives 80 carried by the moveable cylinder 61 of the press, and a complemental anvil 81 carried by the base 61a of the press. On each upstroke of the press, one row of sealed trays is moved and positioned beneath the cutter knives, and on the down stroke of the press the knives sever the row from the sheets 49–52 and sever the individual trays from one another, all along the portions comprising the flanges 21.

The individual trays or services are then moved away from the cut off device at relatively increased speed by a conveyor 82 which delivers the rows of trays on longitudinally spaced relation to one another to a compacting and packing assembly shown in FIGS. 8 and 9. Specifically, belt conveyors 82 deliver the trays to slide bars 84 which are mounted on the frame in coplaner relation at the end thereof adjacent the conveyor 82 and which extend therefrom in vertically staggered and convergent relation. The consequence of such staggering of the bars 84 is that alternate one of the individual trays or services are raised slightly above the intervening trays; and the consequence of the convergency of said bars is to move the trays laterally toward one another so as to cause the flanges 21 thereof to overlap, as shown in FIG. 10. Movement of the services through this "compacting" mechanism is preferably accomplished by an underlying conveyor 85 having spaced, transversely extending pusher bars or cleats 86 for each engaging and moving a row of trays, while simultaneously accommodating the vertical displacement and lateral shifting of individual trays in the row.

Adjacent the tail end of the conveyor 85, the cleats or pusher bars 86 deliver longitudinally spaced transverse rows of compacted or interleaved trays or services to a loader assembly, indicated generally at 87. This assembly includes a vertical box or carton conveyor 88 which is provided with outwardly projecting tabs 89 for supporting a shipping box or carton 24 on one of its ends and a drive mechanism for lowering the carton in timed relation to the operation of the other components of the machine for reception in the horizontal plane of successive rows of the interleaved trays 20, whereby the trays are automatically stacked in the carton to the intended capacity of the carton.

Cooperating with the conveyor 88 is a reciprocating loader 90 operating in timed relationship with the conveyor on a terminal portion of the rails or bars 84 which extend to a location closely adjacent to the carton 24. This loader receives each row of trays from the conveyor 85 and pushes them into the carton as the carton moves past the terminal end of the rails or bars 84. A drive mechanism 91 for the loader causes the same to move in a translatory fashion to accommodate passage of a row of trays, and then to move the loader behind the trays 20 and push the same forwardly into the carton 24.

When a carton 24 has been filled, it is automatically lowered out of the way and the next succeeding carton takes its place adjacent to loader 90. Then, the filled carton is ejected or removed laterally from the conveyor 88, and the product is ready for distribution to restaurants and the like. In the completed package, each pat of butter is hermetically sealed in completely sanitary condition in its own individual tray. As observed, the apparatus of the invention readily accommodates mass production of individual butter services, for example, in excess of 80,000 services per hour. Thus, the objects of the invention have been shown to be attained in an economical, practical and convenient manner.

As will be appreciated, all of the components of the machine are operated in timed sequence with one another. Such operation may be secured by appropriate drive trains leading from a common source of power; or independent power sources may be provided for selected groups of operations, e.g., one source for the printer, knock-out and tray conveyor assembly, a second for the press and the tray advancing means of the press, and a third for the carton conveyor, tray compactor and loader; all within the skill of the art.

While I have shown and described what I regard to be the preferred embodiment of my invention, it is to be appreciated that various changes, rearrangements and modifications may be made therein, without departing from the scope of the invention as defined by the appended claims.

I claim:

1. Apparatus for heat sealing a thermoplastic cover to a product containing tray having a marginal flange to which the cover is to be sealed, comprising heated die means for engaging the tray flange and the portion of the cover overlying the tray flange, a high pressure press carrying said die means, and means for causing said press to engage said die means with the tray flange and the overlying portion of the cover a plurality of times, each time for a period not exceeding in the order of about 0.1 of a second and each time under a pressure of at least in the order of about 2000 pounds per square inch of tray flange area.

2. In the apparatus of claim 1, said die means having a plurality of stations for the reception of the cover and the tray, means for sequentially moving a cover and a tray through each of said stations, and means for operating said press to engage said die means with the tray flange and the overlying portion of the cover under said pressure for a fraction of a second at each of said stations.

3. In the apparatus of claim 2, cutting die means carried by said press posteriorly of said stations, and means for moving covered trays sequentially to said stations and then to said cutting die means.

4. A method for sealing thermoplastic cover means to a product containing tray having a marginal flange to which the cover is to be sealed, comprising the step of engaging heated die means with the tray flange and the portion of the cover overlying the tray flange a plurality of times, each time for a period not exceeding in the order of about 0.1 of a second and each time under a pressure of at least in the order of about 2000 pounds per square inch of tray flange area.

5. The method of claim 4, including the steps of simultaneously sealing a unitary thermoplastic cover sheet to a sheet of tray material having a plurality of rows of trays therein with flanges between the trays by repeatedly engaging the die means with the flanges in each row and the corresponding portion of the cover sheet, and thereafter severing the rows of trays and the trays in each row from one another along said flanges.

* * * * *